(12) United States Patent
McKeeth

(10) Patent No.: US 8,578,331 B2
(45) Date of Patent: *Nov. 5, 2013

(54) COMMAND LINE OUTPUT REDIRECTION

(75) Inventor: James McKeeth, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,768

(22) Filed: May 19, 2011

(65) Prior Publication Data

US 2011/0225597 A1 Sep. 15, 2011

Related U.S. Application Data

(63) Continuation of application No. 09/449,782, filed on Nov. 26, 1999, now Pat. No. 7,958,491.

(51) Int. Cl.
*G06F 9/44* (2006.01)

(52) U.S. Cl.
USPC ............... 717/114; 717/100; 717/143; 711/1; 711/2

(58) Field of Classification Search
None
See application file for complete search history.

(56) References Cited

U.S. PATENT DOCUMENTS

| | | | |
|---|---|---|---|
| 5,664,153 A | 9/1997 | Farrell | |
| 5,745,669 A | 4/1998 | Hugard et al. | |
| 5,758,154 A | 5/1998 | Qureshi | |
| 5,848,025 A | 12/1998 | Marietta et al. | |
| 5,862,379 A | 1/1999 | Rubin et al. | |
| 5,983,325 A | 11/1999 | Lewchuk | |
| 6,052,134 A | 4/2000 | Foster | |
| 6,052,756 A | 4/2000 | Barnaby et al. | |
| 6,061,253 A | 5/2000 | Igarashi et al. | |
| 6,093,215 A | 7/2000 | Buxton et al. | |
| 6,141,792 A | 10/2000 | Acker et al. | |
| 6,151,701 A | 11/2000 | Humphreys et al. | |
| 6,182,279 B1 | 1/2001 | Buxton et al. | |
| 6,199,138 B1 | 3/2001 | Jeddeloh | |
| 6,212,598 B1 | 4/2001 | Jeddeloh | |
| 6,385,766 B1 | 5/2002 | Doran et al. | |
| 6,405,362 B1 | 6/2002 | Shih et al. | |
| 6,535,930 B2 | 3/2003 | Stern et al. | |
| 6,681,265 B1 | 1/2004 | Hlava | |

OTHER PUBLICATIONS

Hill, Tim. "The Windows NT Command Shell", Windows NT Shell Scripting. Copyright 1998. MacMillian Technical Publishing. (retrieved Jul. 15, 2012, available at http://technet.microsoft.com/en-us/library/cc723564.aspx#XSLTsection127121120120).*

(Continued)

*Primary Examiner* — Wei Zhen
*Assistant Examiner* — Matthew Brophy
(74) *Attorney, Agent, or Firm* — Fletcher Yoder

(57) ABSTRACT

In one embodiment the invention provides a method to provide command line utility output to an application without the need of temporary files. The method includes receiving an identifier, receiving output from a command line utility, and storing the command line utility output in a system storage at a location identified by the identifier. In one illustrative embodiment, command line utility output is stored in a system registry database. In another illustrative embodiment, command line utility output is stored in a shared system memory. The method may be stored in any media that is readable and executable by a computer system.

23 Claims, 4 Drawing Sheets

(56) References Cited

OTHER PUBLICATIONS

Geoffrey J. Noer. Cygwin32: A free Win32 porting layer for UNIX applications. In Proceedings of the 2nd USENIX Windows NT Symposium, Seattle, WA, USA, Aug. 1998. Usenix Association.*
David G. Korn. Porting Unix to Windows NT. In Proceedings of the USENIX 1997 Annual Technical Conference, Anaheim, CA, USA, Jan. 1997. Usenix Association.*
"Internet Component Download", Microsoft Corporation, Jan. 1996, http://www.graphcomp.com/info/specs/ms/CODEDWLD.HTM.
"Microsoft Computer Dictionary Fifth Edition", p. 111 & 544, 2002, Microsoft Press, retrieved Dec. 15, 2004.
"Programming the Win32 Registry", http//www.geocities.com/SiliconValley/2072/prgw32rg.htm?20067.
"Using Command-Line Utilities", p. E1-#12, retrieved Dec. 15, 2004, www.cisco.com/univercd/cc/td/doc/product/rtmgmt/sw_nt-man/td_main/td_5_8/traf5_8/cmdline.pdf.
"Windows 95 Application Setup Guidelines for Independent Software Vendors" 1995, http://msdn.microsoft.com/library/techart/setup.htm.
"Windows 95 Secrets, 3rd Edition", p. 315, 1995, "The DOS Version of the Registry Editor", retrieved Dec. 15, 2004.
"Windows registry", Wikipedia; http://en.wikipedia.org.wiki/Windows_Registry, retrieved from google.com search Jan. 31, 2006.
Dietel, H.M.; "Operating Systems", (1990), p. 574, command line and redirection, p. 644, redirected output, output of a command piped to another command.
Hill, Tim; "The Windows NT Command Shell", 1998, retrieved from URL http://www.microsoft.com/technet/archive/winntas/deploy/prodspecs/shellscr.mspx?mfr=true on Oct. 15, 2007.
Kochan, Stephen G., Wood, Patrick H., Exploring the UNIX System Second Edition, 1989, p. 11, p. 81-84, p. 103-111.
Russinovich, Mark, "inside the Windows NT Registry", Apr. 1997, WindowsNT Magazine, retrieved from http://www.winnetmag.com/Articles/Index.cfm?ArticleID=122, retrieved on Aug. 14, 2002.
Weber Systems, Inc. Staff, "UNIX User's Handbook", 1985, p. 170-177.

* cited by examiner

COMMAND LINE OUTPUT REDIRECTION

CROSS-REFERENCE TO RELATED APPLICATION

This application is a continuation of U.S. patent application Ser. No. 09/449,782, which was filed on Nov. 26, 1999.

BACKGROUND

The invention relates generally to computer system support of application program execution and, more particularly but not by way of limitation, to a method and apparatus for redirecting command line utility output to a non-application maintained storage location.

Many applications such as word processing and file viewing programs have occasion to access system information. Often, such system information is available only through command line (e.g., console) utilities. That is, utilities that are accessible only through a command line interface. Illustrative command line utilities include "dir" and "net view" commands available in the Microsoft WINDOWS® operating system and the "w" command available in UNIX® and UNIXe-like operating systems (provides a list of users logged onto a specified computer system).

One difficulty with command line utilities is that their output is not generally directly useable by an executing application. The conventional technique by which a user application obtains command line utility output is shown in FIG. 1. After a temporary text file is created (block 100), the command line utility whose output is desired is invoked via a standard interface (block 102). Output from the command line utility is piped to the temporary file (block 104), from which the application extracts and processes the desired data (block 106). Sound programming practice calls for the destruction/removal of the temporary file created in block 100 (block 108). It will be recognized that a temporary file may be created by the piping operation itself, i.e., during the acts of block 104. Nevertheless, the use of a temporary file is generally considered essential.

A problem with the technique of FIG. 1 is that the application invoking the command line utility may not have file creation privileges on the computer system. If this is so, then the application will be unable to obtain the desired data. Another problem is that if the disk the application has access to is full (i.e., incapable of accepting new or enlarged user files), any attempt to create a new file will generate an error. Yet another problem is that the file name chosen for the temporary file may already be in use. Still another problem is that many new PCs are disk-less and, thus, may not provide a mechanism through which user Initiated (i.e., user invoked application) file input-output is possible. A further problem with prior art techniques such as that shown in FIG. 1 is that maintenance of temporary files is left to the calling application. If the application that creates a temporary file fails to remove it, a plethora of useless files may be to generated over time.

Thus, it would be beneficial to provide a mechanism by which an application program may obtain output from a command line utility without the need to create a temporary file.

SUMMARY

In one embodiment the invention provides a method to provide command line utility output to an application without the need of temporary files. The method includes receiving an identifier, receiving output from a command line utility, and storing the command line utility output in a system storage at a location identified by the identifier. In one illustrative embodiment, command line utility output is stored in a system registry database, which is stored in active memory (temporary storage) when the system is active and stored in a file (permanent storage) when the system is inactive. In another illustrative embodiment, command line utility output is stored in a shared system memory. The method may be stored in any media that is readable and executable by a computer system.

DETAILED DESCRIPTION

Figure 2:
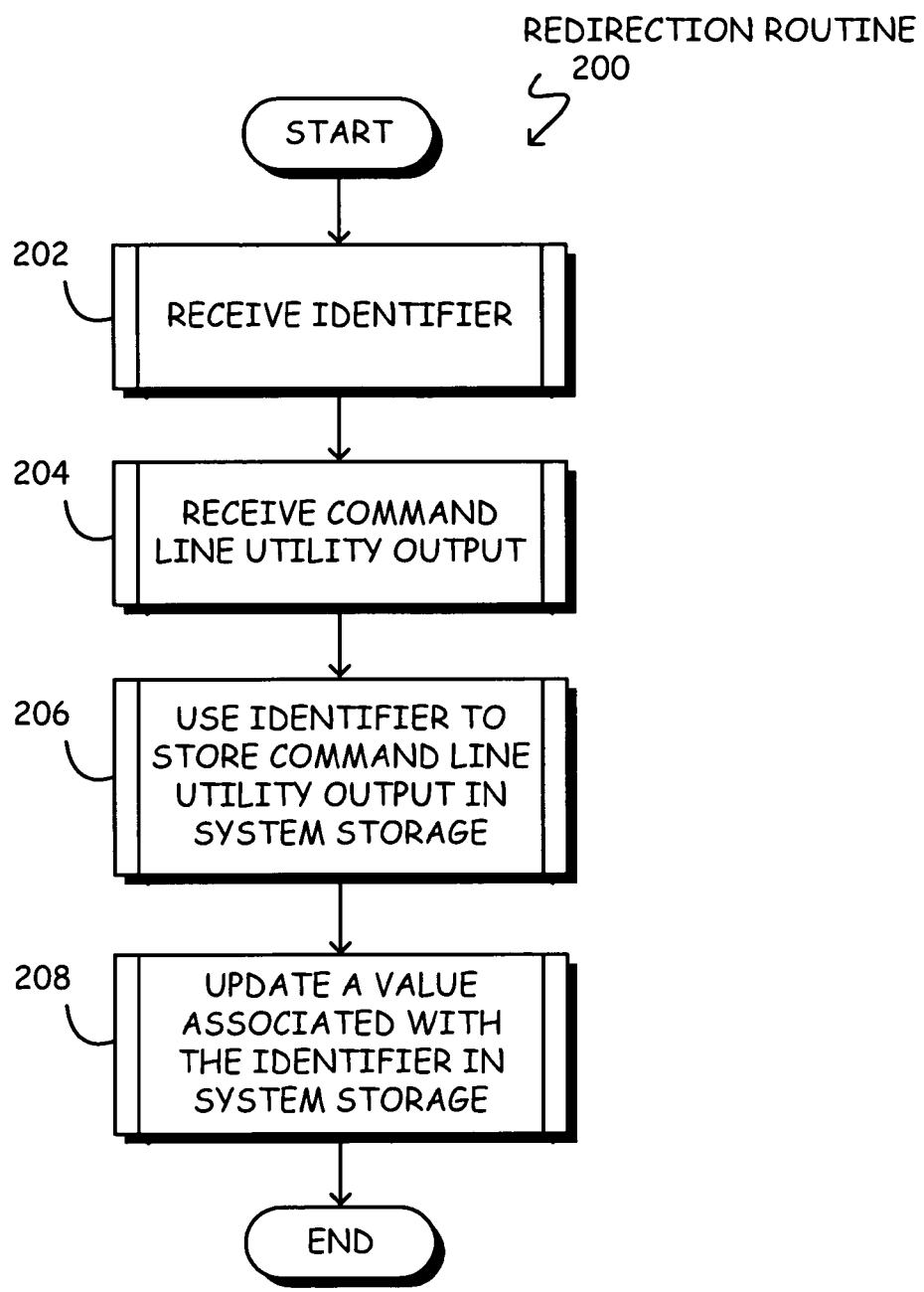
FIG. 2 shows, in flowchart form, the operation of a redirection utility in accordance with one embodiment of the invention.

Referring to FIG. 2, redirection routine 200 in accordance with one embodiment of the invention uses a user/application specified identifier (block 202) to identify command line utility output (block 204) which it stores in a system-wide storage location (block 206). By system-wide, it is meant that the storage location is available to all user applications and is, furthermore, maintained by operation of the underlying operating system. Following the act of storage in block 206, a value associated with the identifier in the system storage is updated to indicate completion of the redirection routine and to, possibly, provide additional information to the calling application such as the amount (e.g., number of lines) of information stored. Once redirection routine 200 completes the act of storing in block 206, the application invoking routine 200 may use the specified identifier to access the stored command line utility output.

Figure 1:
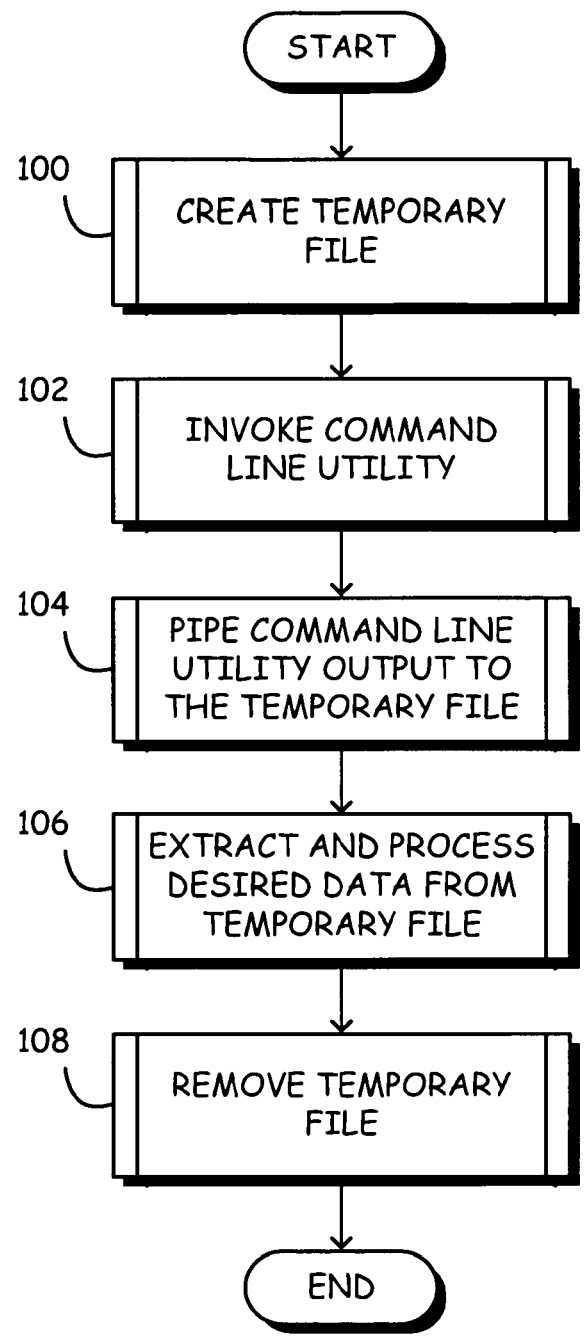
FIG. 1 shows a prior art technique by which an application obtains command line utility output.

One benefit of a redirection routine in accordance with FIG. 2 is that the calling application does not need file creation authority—no temporary files are created. Another benefit is that there is no need for the calling application to remove temporary files as in prior art techniques such as that illustrated in FIG. 1. A corollary of this benefit is that the calling application does not require file deletion authorization. Yet another benefit of a redirection routine in accordance with the invention is that a second application cannot inadvertently destroy the results generated by a first application by accidentally replacing or deleting a temporary file (e.g., a background process designed to remove temporary files).

Still another benefit of the invention is that the application invoking redirection routine 200 does not have to have disk I/O (input-output) authority as the storage location is maintained by the underlying operating system—the application makes I/O calls to the specified storage location through standard system calls (see discussion below).

By way of example, consider a situation in which an executing application needs information of the type provided by command line utility CMD-UTIL, where CMD-UTIL represents any utility executable from a command line prompt (e.g., the "dir" directory command of a Microsoft WINDOWS® operating system or the "head" command of a UNIX® operating system). In accordance with the invention, the application invokes a system call of the form:

CMD-UTIL [PARAM] | REDIRECT ID

Here, [PARAM] represents zero or more parameters that control or modify the 15 execution of the CMD-UTIL utility, the "|" symbol represents the piping function available in many operating systems such as WINDOWS®, UNIX® and derivatives thereof, REDIRECT is the name of routine 200, and ID is one or more parameters which REDIRECT routine 200 associates with output from CMD-UTIL during the act of storage in block 206 of FIG. 2.

It will be recognized that the calling application will generally ensure that the identifier it passes to routine 200 has either not been used or may be reused. It will further be recognized that command utilities may be stacked. That is, output from a first command utility (CMD-UTIL-1, for example) may be piped to a second, third, or Nth command utility (CMD-UTIL-N, for example) which may then be piped to routine 200. In this case, a system call in accordance with the invention would be:

CMD-UTIL-1 [PARAM]| . . . | CMD-UTIL-N [PARAM]| REDIRECT ID, where ". . ." represent one or more commands of the form CMD-UTIL-X [PARAM].

Because many current personal computer systems (PCs) are operated or controlled by one version or another of the Microsoft WINDOWS® operating system, an illustrative embodiment of redirection routine 200 utilizing the WINDOWS® system registry (hereinafter, the registry) will now be given. It will be recognized that the registry is an operating system generated and maintained database which application programs, application setup programs, and the operating system itself use to store configuration information.

Information stored in the registry is organized into hierarchical keys and associated key entries. Current versions of the registry use six predefined root keys (AKA Hives): HKEY_USERS; HKEY.CLASSES.ROOT; HKEY.CURRENT.USER; HKEY.CURRENT.CONFIG; HKEY_LOCAL_.MACHINE; and HKEY.DYN.DATA. Each key in the registry can have one or more sub-key entries. Each key and sub-key can have one or more names (a unique character string identifier) and each name can have an associated value (data stored in a defined manor, may be a character string, binary data, a number, a Boolean value, etc.). Each key and sub-key has one default key entry that has no name.

Access to the registry is provided through system calls defined in the registry application programming interface (API). Illustrative registry API functions include: RegEnumKeyEx, which enumerates the sub-keys of a specified key; RegOpenKeyEx, which opens and returns a handle to a specified key; RegEnumValue, which enumerates the key entries associated with a specified key; RegQueryValueEx, which returns the assigned value of a specified key entry; RegSetValueEx, which assigns a value to a specified key entry, creating the key entry if the key entry was not previously registered; RegDeleteKey, which removes a key from the registry; and RegDeleteValue, which removes a key entry from the registry. Using keys (hereinafter understood to include sub-keys) and registry API system calls, routine 200 can store command line utility output in the registry file. Using the same keys, an application program can retrieve information previously stored by routine 200.

Figure 3:
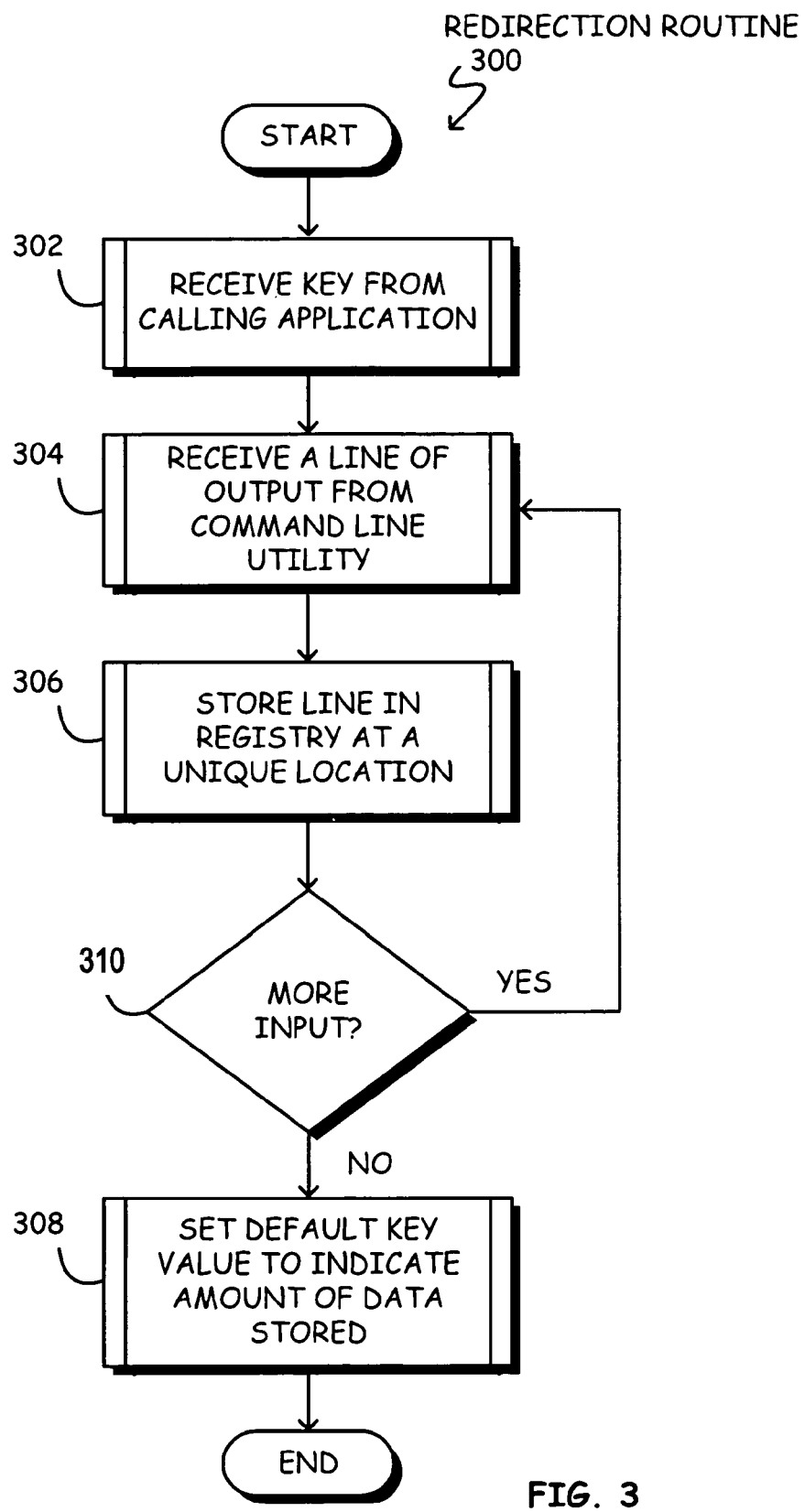
FIG. 3 shows, in flowchart form, the operation of a one specific redirection utility in accordance with FIG. 2.

Referring now to FIG. 3, in one embodiment WINDOWS® based redirection routine 300 receives an identifier comprising a key from a calling application (block 302). An illustrative key is HKEY.DYN.DATA/CMD-UTIL-OUTPUT-KEY. Routine 300 then begins receiving output from the CMD-UTIL utility, generally one line at a time as most command line utilities generate output targeted for line oriented standard output devices such as a computer display (block 304). The received line is stored in the registry at a key name that uniquely identifies the line (block 306). For example, each received line of output may be stored in the registry key:

HKEY.DYN.DATA/CMD-UTIL-OUTPUT-KEY, with a name of "N," where "N" is set equal to 1 for the first received line, 2 for the second received line, and so forth. A test is then made to determine if additional command line utility output is available for storage (diamond 308). If another line of output is available (the "yes" prong of diamond 308), processing continues as block 304. If no more output is available (the "no" prong of diamond 308), the default value of the received key (i.e., HKEY_DYN_DATA/CMD-UTIL-OUTPUT-KEY) is set equal to a value corresponding to the total number of lines received and stored by routine 300 (block 310). On completion, output from the command line utility CMD-UTIL is available for retrieval and manipulation by the calling application without the need to create, maintain or delete a temporary file.

In another embodiment, the ID parameter includes a storage location identifier. One value of the storage location identifier may direct use of the registry (or a similar operating system maintained database) while another value of the storage location identifier may direct use of operating system shared 30 memory (e.g., volatile random access memory). One example of operating system shared memory is the "clipboard" memory maintained by the WINDOWS® operating system.

Figure 4:
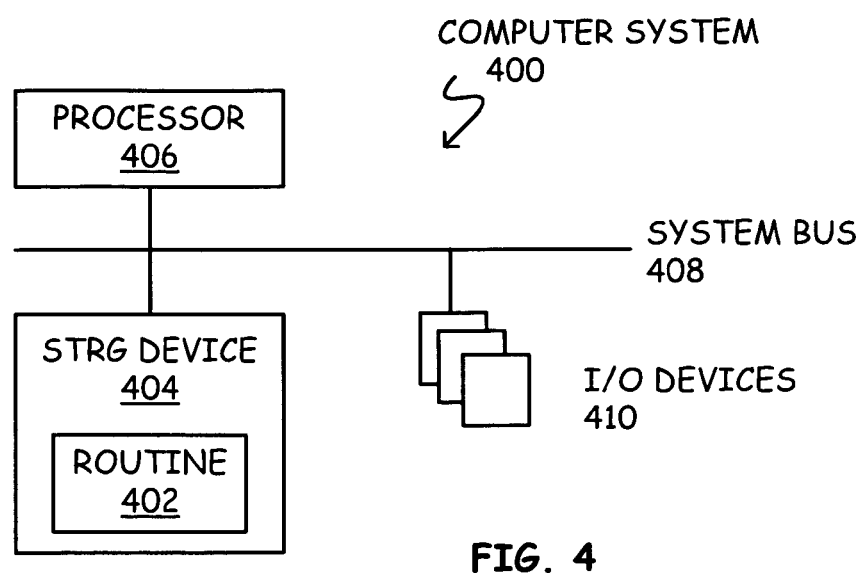
FIG. 4 shows a block diagram of a computer system incorporating a redirection routine in accordance with FIG. 2.

Referring now to FIG. 4, illustrative computer system 400 in accordance with one embodiment of the invention includes redirection routine 402 (e.g., a routine in accordance with 200 and/or 300) to redirect output from a command line utility to a specified operating system controlled memory location. As shown, routine 402 may be retained in storage device 404 which is coupled to processor 406 via system bus 408. It will be understood that storage device 404 may represent non-volatile memory devices or a combination of volatile and non-volatile memory devices. Illustrative non-volatile storage devices include, but not limited to: semiconductor memory devices such as EPROM, EEPROM, and flash devices; magnetic disks (fixed, floppy, and removable); other magnetic media such as tape; and optical media such as CD-ROM disks. It will be further recognized that computer system 400 may incorporate one or more input-output is devices 410 such as one or more secondary bus bridge circuits, memory controllers, accelerated graphics port devices and network interface adapters.

Various changes in the details of the illustrated operational methods as well as in the components of computer system 400 are possible without departing from the scope of the following claims. For instance, instructions to perform the acts of FIGS. 2 and 3 may be embodied in a program module implemented as, for example, a dynamic link library available through a standard interface. In addition, the illustrative system of FIG. 4 may include additional components such as network interface adapters and the like.

Thus, while the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:
1. A method comprising:

receiving, in a computer, a call invoked by an application unable to receive command line utility outputs via a command line interface, to execute at least a command line utility, the application providing an identifier in the call, wherein the identifier comprises a system registry storage location accessible by the application, and wherein the command line utility is a utility executable from a command line prompt;

receiving output from the command line utility;

storing the output received from the command line utility in the system registry storage location identified by the identifier; and providing, by the computer, the output of the command line utility to the application from the system registry storage location identified by the identifier.

2. The method of claim 1 wherein the identifier identifies one or more entries in a system registry database.

3. The method of claim 2 wherein providing the identifier comprises providing a root key identifier.

4. The method of claim 3 wherein providing the root key identifier comprises providing a sub-key identifier.

5. The method of claim 1 wherein the system registry storage location comprises one of: an operating system registry database, a registry maintained by an operating system of the computer, and a shared memory maintained by an operating system of the computer.

6. The method of claim 1 wherein providing the identifier indicates a system registry database.

7. The method of claim 1 wherein receiving of the output from the command line utility comprises receiving output directly from the command line output utility.

8. The method of claim 1 wherein receiving of the output from the command line utility comprises receiving output from the command line output utility through a subsequent command line output routine.

9. The method of claim 8 wherein the identifier identifies a parameter for the subsequent command line output routine.

10. The method of claim 8 wherein the identifier identifies one of: the subsequent command line output routine and the command line utility.

11. The method of claim 10 wherein storing of the output comprises associating each line of the output from the command line utility with a line identifier in a system registry database.

12. The method of claim 11 further comprising setting the line identifier to a value corresponding to a position of that line in the output from the command line utility.

13. The method of claim 11 further comprising setting a default value of the identifier provided in the call to equal the total number of command utility output lines stored in the system registry database.

14. The method of claim 1 wherein the command line utility comprises a first command line utility, and wherein the call invoked by the application requests to pipe output of a second command line utility to the first command line utility, wherein the output stored in the system registry storage location comprises output of the second command line utility.

15. A program storage device, readable by a computer, storing instructions configured to instruct the computer to:

receive, in the computer, from an application without a command line interface that may receive command utility outputs, a call invoked to execute at least a command line utility, the application providing at least one identifier in the call, wherein the identifier comprises a system registry storage location, and wherein the command line utility is a utility executable from a command line prompt;

receive output from the command line utility;

store the output received from the command line utility in the system registry storage location identified by the at least one identifier; and provide, by the computer, the output of the command line utility to the application from the system registry storage location identified by the at least one identifier.

16. The program storage device of claim 15 wherein the instructions are configured to instruct the computer to receive one or more lines of the output from the command line utility, and to store each of said one or more lines of the output in a system registry database.

17. The program storage device of claim 16 wherein the instructions are further configured to instruct the computer to associate a unique identifier with each of the one or more lines of the output stored in the system registry database.

18. The program storage device of claim 16 wherein the instructions are further configured to instruct the computer to set a value associated with the received identifier equal to the number of lines of the output stored in the system registry database.

19. The program storage device of claim 15 wherein the command line utility comprises a first command line utility and the call is invoked by the application to pipe output of a second command line utility to the first command line utility, and wherein the output stored in the system registry storage location comprises output of the second command line utility.

20. The program storage device of claim 19 wherein the identifier identifies the first command line utility.

21. The program storage device of claim 15 wherein the system registry storage location is in one of: a system registry database, a registry maintained by an operating system of the computer, or a shared system memory maintained by the operating system of the computer.

22. A computer system comprising:

a processor; and memory storing instructions including an operation system and a command line utility, wherein the command line utility is a utility executable by the processor under control of the operation system from a command line prompt, wherein when an application without a command line interface that may receive command utility outputs that is executable on the processor invokes a call to the operation system to execute at least the command line utility, the application provides at least one identifier in the call identifying a system registry location accessible by the application, and the instructions cause the system registry storage location identified by the at least one identifier to store an output of the command line utility, enabling the application to retrieve the output of command line utility from the system registry storage location identified by the at least one identifier.

23. The computer system of claim 22 wherein the at least one identifier identifies the command line utility.

* * * * *

UNITED STATES PATENT AND TRADEMARK OFFICE
CERTIFICATE OF CORRECTION

| | | |
|---|---|---|
| PATENT NO. | : 8,578,331 B2 | Page 1 of 1 |
| APPLICATION NO. | : 13/111768 | |
| DATED | : November 5, 2013 | |
| INVENTOR(S) | : James McKeeth | |

It is certified that error appears in the above-identified patent and that said Letters Patent is hereby corrected as shown below:

On the title page, Item (56), under "Other Publications", in column 2, line 2, delete "MacMillian" and insert -- MacMillan --, therefor.

Signed and Sealed this
Eleventh Day of February, 2014

Michelle K. Lee
*Deputy Director of the United States Patent and Trademark Office*